United States Patent
Dubrovsky

(10) Patent No.: US 7,282,152 B2
(45) Date of Patent: Oct. 16, 2007

(54) SELENIUM REMOVAL METHOD

(75) Inventor: Michael Dubrovsky, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 748 days.

(21) Appl. No.: 10/683,614

(22) Filed: Oct. 10, 2003

(65) Prior Publication Data

US 2005/0079114 A1   Apr. 14, 2005

(51) Int. Cl.
*B01J 20/10* (2006.01)
*C02F 1/42* (2006.01)

(52) U.S. Cl. ............. 210/660; 210/666; 210/912; 210/688

(58) Field of Classification Search ............ 210/660, 210/666, 912, 688
See application file for complete search history.

(56) References Cited

U.S. PATENT DOCUMENTS 4,472,358 A * 9/1984 Khudenko ............ 422/141
4,915,928 A * 4/1990 Marcantonio ............ 423/510
5,354,477 A    10/1994 Rush
5,601,721 A * 2/1997 Lukasiewicz et al. ....... 210/670
5,616,533 A * 4/1997 Tavlarides et al. .......... 502/407
5,968,364 A   10/1999 Virnig et al.
6,090,290 A * 7/2000 Goodman et al. .......... 210/666
6,159,379 A * 12/2000 Means et al. ............. 210/708
7,060,302 B1 * 6/2006 Hickok ..................... 424/617

OTHER PUBLICATIONS

Jeffrey J. Smith et al., Produced Water Polishing, Filtration and Filter Monitoring System Promotes Compliance During Conventional Treatment Upsets, CETCO Offshore—Technology Paper Dec. 2002, pp. 1-8.

* cited by examiner

*Primary Examiner*—Chester T. Barry
(74) *Attorney, Agent, or Firm*—Steven H. Roth

(57) ABSTRACT

The present invention provides a method for removing selenium from an aqueous stream by passing the aqueous stream, in combination with a quaternary amine compound, through a filter and recovering a treated aqueous stream which is depleted in selenium content relative to the untreated aqueous stream. The present method removes selenium from an aqueous refinery stream by passing the aqueous stream, in combination with a quaternary amine compound, through a filter that can include clay, cellulose, starch, activated carbon, and the like.

20 Claims, No Drawings

SELENIUM REMOVAL METHOD

FIELD OF THE INVENTION

The present invention relates to a method for removing selenium from aqueous streams. More specifically, the present invention relates to a method for removing selenium from wastewater effluent, and still more specifically, to a method for removing selenium from petroleum refining wastewater. The method is especially useful for removing selenium from streams from refinery sour water strippers.

BACKGROUND OF THE INVENTION

Selenium is a naturally occurring element that can occur in several oxidation states. It can exist in the [−II] (selenide), [O] (elemental selenium), [+IV] (selenite), and [+VI] (selenate) oxidation states. Selenium can be stabilized in aqueous solutions with $CN^-$ to form selenocyanate or by organic compounds to form mercaptan analogues such as dimethylselenide or isoselenocyanates. Selenium is a ubiquitous element having an average concentration of about 0.7 ppm in the earth's crust, and is concentrated in such diverse things as plants, sulfur deposits, sulfide minerals of copper and molybdenum, and fossil fuels. As a result, selenium can be found in waste streams from copper refining, acid coal mine drainage, coal-fired power plants, and petroleum refining. Selenium is generally considered to be hazardous, and selenium disposal is carefully regulated.

Selenium has also been found in waste agricultural irrigation water. In this regard, the presence of selenium in waste agriculture and irrigation water recently has become a major pollution concern. Selenium poisoning has been implicated in waterfowl deaths and deformities at the Kesterson National Wildlife, Refuge near Los Banos, Calif. The potential of selenium poisoning, therefore, has generated significant interest in a number of different industries where research activity has been directed to the removal of selenium from wastewater.

A particularly acute problem of concentrated selenium discharge occurs in the waste waters from petroleum refineries. Many refineries have this problem, to a lesser or greater extent depending on the origin of the crude oil. As the selenium is isomorphous with sulfur, it accompanies sulfur in the processing of the oil. If selenium is present it generally accompanies sulfur in the oil. Crude oil taken from the San Joaquin Valley in Calif., for example, has relatively high selenium content. Most of the sulfur and selenium found in crude ends up in refinery sour water streams which are subsequently treated by sour water strippers. However, while the stripping of hydrogen sulfide from sour water in conventional sour water strippers is highly efficient, significant amount of selenium compounds remains in the stripped sour water. The predominant selenium compounds remaining in the stripped sour water are hydrogen selenide and selenocyanate. Minor amounts of elemental selenium and oxidized forms such as selenite and selenate might also be present. Typically the stripped sour water, containing selenium compounds, is directed for further treatment with the rest of the refinery wastewater and in the process it gets oxidized to elemental selenium, selenite and selenates. As a result, in the waste water discharge from refineries processing crude oil high in selenium, selenium content has been high. In the case of several refineries located in the San Francisco Bay area the concentration of selenium in the wastewater could be above accepted levels for safe discharge.

As noted above, selenium is introduced to the refinery process through the crude oil which is processed in the refinery. It may be partially removed in the initial crude dewatering and desalting steps, but much of the selenium is carried over into petroleum processing, such as hydroprocessing or fluid catalytic cracking. Selenium present in the products from these processes is removed by aqueous treatments such as washing and absorption. The aqueous streams from the various aqueous treatment processes in the refinery are generally combined into a sour water stream, which is treated for recycle and/or for disposal.

Sour water is process water recovered from petroleum or hydrocarbon streams during refinery operations. For example, sour water may be recovered from the petroleum streams, as in crude oil dewatering, it may be recovered from a washing process, such as during crude oil desalting, or it may be recovered from an absorption process, such as, for example, removing sulfur and nitrogen compounds from hydroprocessed products. Sour water generally contains soluble oil and free oil contaminants, inorganic ions such as ammonia, sodium, sulfates, sulfites, chlorides, $CO_2$, OH and also solids that are typically corrosion products such as iron sulfides, iron oxides or hydrates etc.

Sour water is typically processed in a sour gas stripper. A sour gas stripper is a single or multi-stage separation zone for treating sour water. The stripping action may be facilitated by the introduction of a hot gaseous stripping medium, such as steam. The overhead stream from the sour gas stripper may include ammonia, hydrogen sulfide, purified water vapor, or combinations thereof, depending on the particular process. The bottoms product from the stripper is a stripped sour water stream. The stripped sour water stream generally contains the majority of the selenium compounds. Efforts to remove the selenium from a sour water stream were unsuccessful so far. Effluents of sour water strippers are difficult to treat for selenium removal because of the unpredictable nature and unpredictable quantities of contaminants that are present in the effluents. These contaminants often hinder irreversibly selenium removal processes that use membrane, ion exchange resins or inorganic adsorbents. The method of the present invention is especially useful for removing selenium from sour water in the presence of contaminants of variable composition and quantity, especially in the presence of free and soluble oil. However, any aqueous stream may be usefully treated using the present method.

Because the selenium concentration in a typical refinery wastewater effluent is generally very low, i.e., typically in the ppb range, wastewater treatment techniques that have been used to remove selenium have been of the adsorption type such as iron and aluminum hydroxide adsorption. Also, reverse osmosis techniques have been attempted and were found to be very costly and difficult to operate due to membrane fouling with free oil and solids. The success of the various adsorption methods depends largely on the selenium species present and on competitive ions in solution.

As noted above, selenium can exist as selenide, elemental selenium, selenite, selenate, and selenium complexes with cyanite or organic bases. Of these species, ion exchange favors selenocyanate over selenate and selenate over selenite, whereas the iron hydroxide adsorption has no affinity for selenocyanate and favors selenite over selenate. Since most refinery final effluents and natural waters include a mixture of selenate and selenite selenium species, it has been difficult to approach complete removal of selenium from refinery effluents or natural water using only one step. Furthermore, oxidation to, or reduction from, the selenate state is kinetically very slow which further inhibits optimization. Ion exchange also has not been a successful removal technique because selenate shows almost identical resin affinity as sulfate, which is usually present in a concentration of several orders of magnitude higher than selenate. Thus, the sulfate simply preferentially competes with selenium for resin sites. Furthermore, ion exchange resins become fouled when used to treat selenium wastewater and methods for regeneration are often inadequate and unpredictable.

Among other things, the method of the present invention quantitatively, and inexpensively, removes selenium from stripped sour water prior to combining the stripped sour water with other refinery wastewater for further processing.

As noted previously, the method of the present invention is especially effective with respect to the removal of selenium from the strip sour water effluent waste waters produced from petroleum refineries, although it is useful with other industrial effluent waters as well. Industrial processes include synfuel from coal conversion and many metallurgical processes, particularly precious metals process solutions that involve cyanidation of selenium containing precious metal ores or concentrates. The latter includes mineral processing waste, and particularly heap leach gold mine washings. In the case of some industrial processes there will also be, or there will alternatively be, molybdenum and/or other toxic metals present. The method of the invention is effective to remove most such toxic metals, as well as selenium.

Current methods for removing selenium from stripped sour water involve ion exchange resin. In these methods, the selenium-containing sour water passes over an ion exchange resin, which selectively adsorbs the selenium. While this method is effective, ion exchange resins are very expensive. Further, their use in this service is severely limited by the tenacity with which selenium, particularly selenocyanate, irreversibly adsorbs on the ion exchange resin. Methods for removing the selenium and regenerating the resin are generally ineffective, thus rendering the resin permanently deactivated. The present invention provides, among other things, a way to quantitatively remove the selenium from stripped sour water in a cost effective manner by passing a selenium-containing aqueous stream in combination with a quaternary amine compound through a filter and recovering a treated aqueous stream which is depleted in selenium content relative to the untreated selenium-containing aqueous stream.

An example of an ion exchange process is disclosed in U.S. Pat. No. 4,915,928 to Marcantonio. The patent relates to a process for removing selenium from wastewater effluent which includes the steps of; (i) contacting a selenide containing wastewater and a strong-base anion exchange resin to absorb selenide on the resin; (ii) eluting the ion exchange resin with an eluant which is effective for stripping selenide therefrom; and (iii) recovering elemental selenium from the selenide containing eluate resulting from step (ii).

A process for removing selenium, present in the waters as selenocyanate, by precipitation with copper (II) salts was shown to effectively precipitate selenium under laboratory conditions. In this process the selenium is precipitated as an alpha $Cu(S_{0.91}Se_{0.09})CN$ solid solution. However, this process, although successful under controlled conditions did not work well in an actual refinery operation.

There is a need for a reliable process for removing selenium from refinery wastewaters under actual refinery operating conditions where the amount of free oil contaminants and soluble oil contaminants vary unpredictably. The present invention, among other factors, provides such a process.

SUMMARY OF THE INVENTION

The present invention provides a method for removing selenium from an aqueous stream by passing the aqueous stream, in combination with a quaternary amine compound, through a filter and recovering a treated aqueous stream which is depleted in selenium content relative to the untreated aqueous stream. The present method removes selenium from an aqueous refinery stream by passing the aqueous stream, in combination with a quaternary amine compound, through a filter that can include clay, cellulose, starch, activated carbon, and the like.

DETAILED DESCRIPTION

As discussed in detail in the "Background of the Invention", selenium is introduced to the refinery processes through the crude oil. Selenium present in the products from these refinery processes is removed by aqueous treatments and combined into sour water streams and steam stripped before reuse or ultimate disposal. And because selenium is frequently regulated by refinery NPDES permits, it must be removed from the sour water streams before they are discharged. As was also discussed, conventional ion exchange methods for removing the selenium from stripped sour water are very expensive.

While not being bound to any particular theory of operation, the present method is based in part on the discovery that selenium compounds, especially selenocyanate and free and soluble oil co-adsorb strongly and irreversibly on conventional filter materials in the presence of quaternary amines. This discovery is significant because at least a portion, and generally a major portion, of the selenium in sour water occurs as selenocyanate (SeCN). Add to this the fact that conventional filter materials such as clay, cellulose, starch, activated carbon and the like are substantially cheaper than conventional resins and therefore may be economically sent for disposal when saturated. Clay especially, can operate at high temperature encountered in stripped sour water effluent streams (200° F.-300° F.). So, the present invention unexpectedly provides a method for removing selenium without plugging and without fouling even when oil or other fouling components are present.

The term "selenium" as used herein generally refers to all compounds of the element selenium including for example selenite and selenate, as well as the elemental form.

The filter used in the method of the invention includes filter media which will absorb or otherwise remove a quaternary amine compound from an aqueous solution. Examples of filter media that may be used in practicing the invention include clay, cellulose, starch, activated carbon, and the like. Other filter media may be used that will be apparent to those persons having ordinary skill in wastewater treatment technology.

Filters suitable for practicing the present method are available commercially. These filters contain a filter medium containing a quaternary amine in combination a solid sorbent. These are marketed for the purpose of removing oil from aqueous streams, and are generally used during crude oil production, particularly on oil platforms. Using filters that contain a quaternary amine compound eliminates the need to add the compound to the selenium-containing aqueous solution and as a consequence is a preferred embodiment of the invention. These quaternary amine-containing filters are available from the following companies:
CETCO—clay filter medium
Clerity and US Filter/Ametek—cellulose medium
Clearwater—starch medium Quaternary amine compounds are synthetic derivatives of ammonium compounds, generally ammonium chloride, with the generalized formula $R^1R^2R^3R^4N+X-$, where $R^1R^2R^3$ and $R^4$ are the same or different and are an alkyl or aryl group, preferably an alkyl group, more preferably linear and branched paraffins having a chain length of $C_4$-$C_6$, preferably $C_4$-$C_{20}$, and more preferably $C_4$-$C_{12}$ and X is an anion (e.g. halogen, such as bromide, iodide, or chloride).

Quaternary amines have been used to remove oil and water soluble organics from water as disclosed in U.S. Pat. Nos. 5,354,477 and 6,159,379, incorporated by reference herein. Use of CrudeSorb® to remove oil from produced water is described in "Produced Water Polishing" CETCO Offshore—Technology Paper (December 2002).

Although using a filter medium that contains a quaternary amine compound is a preferred embodiment of the present method, a filter medium that does not contain a quaternary amine compound may suitably employed. In this case, a quaternary amine compound is added to the wastewater.

The present method is quite flexible in its application and may be practiced under a wide variety of conditions. Optimization of these conditions is within the purview of a person having ordinary skill in wastewater treatment technology.

The temperature at which the aqueous stream containing selenium may be treated is not critical and generally ranges from ambient temperature up to the boiling temperature of the aqueous stream. Temperatures lower than ambient temperature may also be used.

Likewise, the pressure at which the aqueous stream containing selenium may be treated is not critical and generally ranges from ambient pressure up to about 200 psig. The flow rate of the aqueous stream depends on the particular processing equipment that is employed and could range from 0.1 to 480 gpm and in practice will typically range from 48 to 480 gpm.

A prefiltration step may be used in carrying out the method of the present invention. For example, sock filtration may be used before the main filtration units to act as a prefiltration to capture particulates and prevent them from impacting the main filtration units. Were such particulates to escape that could result in premature fouling or plugging of the main filtration units. Other methods of prefiltration of wastewater are well known and could be used.

The effluent stream from the filter may be monitored to ensure complete selenium removal. Selenium breakthrough conditions as determining by measuring selenium concentration in the wastewater treated by the filter would typically indicate that the filter is saturated and must be replaced. The filter is then generally sent for disposal or special regeneration.

In another embodiment of the present invention, the selenium removal is conducted in two stages. In this embodiment, after passing the aqueous stream in combination with a quaternary amine compound through a filter to produce an effluent which is depleted in selenium content relative to the untreated selenium-containing aqueous stream, the effluent is passed through a conventional filter medium, preferably activated carbon, whereby the effluent is further depleted in selenium content.

In yet another embodiment of the present invention, the selenium removal is conducted in multiple stages. In this embodiment, after passing the aqueous stream in combination with a quaternary amine compound through a filter to produce an effluent which is depleted in selenium content relative to the untreated selenium-containing aqueous stream, the effluent is passed through a conventional filter medium, preferably activated carbon, whereby the effluent is further depleted in selenium content. The treated effluent is then contacted by an anion exchange resin in one or more columns as described, for example, in U.S. Pat. Nos. 4,915,928 and 5,601,721, which are incorporated by reference as if fully set forth herein. The method of the present invention is especially advantageous in this embodiment because the resin is contacted with only minimal amounts of selenium and will consequently have a much longer run life than when an ion exchange resin is used alone.

EXAMPLES

The following examples are intended to illustrate the present invention and are not intended to limit the invention in any way.

Materials:

Stripped sour wastewater was obtained from an oil refinery. The wastewater contained selenium produced from the refining of crude oil. A portable diesel driven centrifugal pump was used to move the selenium containing wastewater through the train of filters. The pump had a maximum capacity of 40 gallons of water per minute was used to feed the wastewater through the pilot plant filtration system. The pilot plant filtration system was comprised of at least one CETCO filtration unit containing twenty four CrudeSorb® filter canisters or approximately twelve cubic feet of CrudeSorb® media. The pilot plant filtration system also contained at least one activated carbon unit containing approximately twelve cubic feet of Calgon activated carbon, a mixture of $F_{300}$ and $F_{400}$ activated carbon. The pilot plant filtration system also consisted of at least two resin filtration units each containing approximately twelve cubic feet of anion exchange resin (Sybron Ionac).

Experiment:

The method of the present invention was demonstrated in a pilot plant filtration system with four filtration units. In addition, sock filtration was used in front of the four main filtration units to act as a prefiltration. The first filtration unit of the pilot plant filtration system was designed using the CETCO CrudeSorb® for the initial purpose of reducing the oil and grease levels in the waste water and preventing the fouling of the subsequent filtration units by oil and grease. The CrudeSorb® not only absorbed oil and grease as expected but surprisingly absorbed much more selenium than expected. The next filtration unit was filled with activated carbon. This was followed by two anion exchange resin filled filtration units to reduce the concentration of RCRA hazardous metals such as selenium.

The pilot plant filtration system contained prefiltration consisting of two sock filters. The prefiltration was followed by a CETCO filtration unit containing (24) CrudeSorb® filter canisters, an activated carbon filtration unit containing twelve cubic feet of Calgon activated carbon, and two resin filtration units each containing twelve cubic feet of anion resin. Each filtration unit was connected in series from top inlet to bottom discharge. Water samples were taken at the storage tanks before the start of each pilot run and at each filtration unit outlet at four hour intervals for up to 36 hours. Water sampling was conducted in compliance with refinery SOP and quality assurance protocols as well as USEPA sampling protocol. A diesel powered centrifugal pump was used to push the waste water through the pilot plant filtration system at feed rates up to 28 gpm and as low as 13 gpm. Selenium levels were measured using USEPA Method 200.7 or APHA 3114B.

The pilot plant filtration system was operated at ambient temperature, but was capable of running at temperatures up to the boiling point of the aqueous stream. The pressure was less than 100 psig. The flow rates can range from 0.1 to 40 gpm depending on the particular processing equipment. The effluent stream from the filter outlets was monitored to ensure selenium removal and to indicate selenium breakthrough once the filter was saturated.

Results and Discussion:

Some reductions in selenium levels were expected in the carbon filtration unit and more so in the two anion resin units. However, it was found that the CETCO filtration unit containing CrudeSorb® filter canisters, which contain a quaternary amine compound, was surprisingly very effective at removing the selenium contained in the stripped sour water.

The first pilot plant run (Table 1) lasted 32 hours indicating that the CrudeSorb® removed the selenium at an averaged rate of 74% with the activated carbon removing the remaining selenium to a non detection limit of less than 2 µg/liter. The feed rate was 25 gpm with a total waste water volume treated of 50,148 gallons. The feed initial selenium level composited was 161 µg/l.

TABLE 1

Run 1

| Run Time | Feed | QA | Carbon | Resin 1 | Resin 2 |
|---|---|---|---|---|---|
| 0 | 126 | 0 | 0 | 0 | 0 |
| 4 | 130 | 46.5 | 20.7 | 0 | 0 |
| 8 | 124 | 63.6 | 46.4 | 0 | 0 |
| 12 | 83 | 10.4 | 0 | 0 | 0 |
| 16 | 115 | 10.1 | 0 | 0 | 0 |
| 20 | 147 | 0 | 0 | 0 | 0 |
| 24 | 111 | 49.9 | 19.7 | 0 | 0 |
| 28 | 165 | 78.6 | 55.3 | 0 | 0 |
| 32 | 200 | 57.6 | 47.5 | 15.1 | 0 |

Feed Rate = 25 GPM
Volume = 50,148 gallons
pH = 8.11
Initial Se = 161 ug/l

Amount of Removal

| Run Time | µg/l QA | Carbon | Resin 1 | Resin 2 |
|---|---|---|---|---|
| 0 | 126 | 0 | 0 | 0 |
| 4 | 83.5 | 25.8 | 20.7 | 0 |
| 8 | 60.4 | 17.2 | 46.4 | 0 |
| 12 | 72.6 | 10.4 | 0 | 0 |
| 16 | 104.9 | 10.1 | 0 | 0 |
| 20 | 147 | 0 | 0 | 0 |
| 24 | 61.1 | 30.2 | 19.7 | 0 |
| 28 | 86.4 | 23.3 | 55.3 | 0 |
| 32 | 142.4 | 10.1 | 32.4 | 15.1 |

A second pilot plant run (Table 2) using the same filtration system without changing any of the filtration media was conducted for another 28 hours. The feed rate was 25 gpm with a total waste water volume treated of 48,846 gallons. The feed initial selenium levels ranged from 776 to 843 µg/l. The CrudeSorb® removed the selenium at an averaged rate of 57% with the activated carbon removing another 13% and the anion exchange resin removing another 20%.

TABLE 2

Run 2

| Run Time | Feed | QA | Carbon | Resin 1 |
|---|---|---|---|---|
| 0 | 376 | 143 | 114 | 72.5 |
| 4 | 388 | 154 | 116 | 79.6 |
| 8 | 370 | 130 | 104 | 81.8 |
| 12 | 430 | 93.1 | 50.3 | 31.2 |
| 16 | 136.2 | 46.45 | 23.91 | 12.06 |
| 20 | 139.4 | 84.34 | 42.22 | 18.09 |
| 24 | 160.6 | 91.14 | 74.09 | 45.39 |
| 28 | 167.4 | 97.73 | 76.73 | 51.31 |

Feed Rate = 25 GPM
Volume = 48846 gallons
pH = 8.46-8.71
Initial Se = 776-843 µg/l Amount of Removal

| Run Time | µg/l QA | Carbon | Resin 1 | Resin 2 |
|---|---|---|---|---|
| 0 | 233 | 29 | 41.5 | 57.9 |
| 4 | 234 | 38 | 36.4 | 38.9 |
| 8 | 240 | 26 | 22.2 | 34.7 |
| 12 | 336.9 | 42.8 | 19.1 | 21.1 |
| 16 | 89.75 | 22.54 | 11.85 | 12.06 |
| 20 | 55.06 | 42.12 | 24.13 | 18.09 |
| 24 | 69.46 | 17.05 | 28.7 | 17.5 |
| 28 | 69.67 | 21 | 25.42 | 9.81 |

A third pilot plant run (Table 3) using the same filtration system without changing any of the filtration media was conducted for another 20 hours. The feed rate was 28 gpm with a total waste water volume treated of 48,762 gallons. The feed initial selenium levels ranged from 130 to 190 µg/l. The CrudeSorb®) removed the selenium at an averaged rate of 33% with the activated carbon removing another 14% and the anion exchange resin removing another 20%.

TABLE 3

Run 3

| Run Time | Feed | QA | Carbon | Resin 1 | Resin 2 |
|---|---|---|---|---|---|
| 0 | 158 | 111 | 84.1 | 55.5 | 42.5 |
| 4 | 154 | 92.8 | 80.1 | 51.6 | 50.8 |
| 8 | 134 | 98.6 | 89.5 | 64.2 | 60.4 |
| 12 | 152 | 107 | 69.6 | 57.8 | 52.2 |
| 16 | 195 | 122 | 105 | 86 | 75.6 |
| 20 | 182 | 121 | 76.3 | 83.2 | 109 |

Feed Rate = 28 GPM
Volume = 48762 gallons
pH = 6.79-7.36
Initial Se = 130-190 µg/l Rate of Removal

| Run Time | µg/l QA | Carbon | Resin 1 | Resin 2 |
|---|---|---|---|---|
| 0 | 47 | 26.9 | 28.6 | 13 |
| 4 | 61.2 | 12.7 | 28.5 | 0.8 |
| 8 | 35.4 | 9.1 | 25.3 | 3.8 |
| 12 | 45 | 37.4 | 11.8 | 5.6 |
| 16 | 73 | 17 | 19 | 10.4 |
| 20 | 61 | 44.7 | −6.9 | −25.8 |

A fourth pilot plant run (Table 4) using the same filtration system without changing any of the filtration media was conducted for another 24 hours. The feed rate was 28 gpm with a total waste water volume treated of 47,103 gallons.

The feed initial selenium levels ranged from 204 to 246 µg/l. The CrudeSorb® removed the selenium at an averaged rate of 36% with the activated carbon removing another 20% and the anion exchange resin removing another 25%.

TABLE 4

Run 4

| Run Time | Feed | QA | Carbon | Resin 1 | Resin 2 |
|---|---|---|---|---|---|
| 0 | 158 | 98.7 | 91 | 61.8 | 35.8 |
| 4 | 144 | 92.4 | 86.9 | 57.6 | 38.2 |
| 8 | 166 | 90.3 | 83.4 | 48.7 | 33.8 |
| 12 | 196 | 143 | 128 | 104 | 87.2 |
| 16 | 258 | 150 | 117 | 92.8 | 84.9 |
| 20 | 154 | 101 | 58.1 | 51.3 | 42.5 |
| 24 | 167 | 122 | 69.3 | 63.7 | 47 |

Feed Rate = 28 GPM
Volume = 47103 gallons
pH = 8.06-8.66
Initial Se = 204-246 µg/l

| Run Time | Amount of Removal µg/l QA | Carbon | Resin 1 | Resin 2 |
|---|---|---|---|---|
| 0 | 59.3 | 7.7 | 29.2 | 26 |
| 4 | 51.6 | 5.5 | 29.3 | 19.4 |
| 8 | 75.7 | 6.9 | 34.7 | 14.9 |
| 12 | 53 | 15 | 24 | 16.8 |
| 16 | 108 | 33 | 24.2 | 7.9 |
| 20 | 53 | 42.9 | 6.8 | 8.8 |
| 24 | 45 | 52.7 | 5.6 | 16.7 |

A fifth pilot plant run (Table 5) using the same filtration system without changing any of the filtration media was conducted for another 56 hours. The feed rate was 13 gpm with a total waste water volume treated of 51,786 gallons. The feed initial selenium levels ranged from 109 to 182 ppb. The Crudesorb® was bypassed with the activated carbon removing 85% and the anion exchange resin removing another 5%.

This last result was achieved with activated carbon alone and is a very good and quite unexpected result. This suggests that the composition of the wastewater and especially of selenium compounds changed to the point where activated carbon is also a very effective remover of selenium, just by itself. This shows that having all three units operate in combination, a quaternary amine filter, an activated carbon filter and an ion exchange is most preferred embodiment, since the combination can handle variations in wastewater and still remove selenium to required levels.

The pilot tests results were surprising since they broke out of the predicted ranges for both the quaternary amine and the activated carbon. This suggests that something unpredictable is happening. Without being bound to any particular theory of operation, a possible explanation could be that the composition of the stripped sour water changes all the time and there are times that a quaternary amine works well; and sometimes the activated carbon works well.

TABLE 5

Run 5

| Run Time | Feed | Carbon | Resin 1 | Resin 2 |
|---|---|---|---|---|
| 0 | 117 | 36.5 | 0 | 0 |
| 4 | 107 | 25 | 0 | 0 |
| 8 | 120 | 18.5 | 0 | 0 |
| 12 | 121 | 18.5 | 0 | 0 |
| 16 | 132 | 25.1 | 0 | 3.4 |
| 20 | 182 | 38.8 | 8.5 | 5.4 |
| 24 | 146 | 24.3 | 6.7 | 4.4 |
| 28 | 161 | 23.9 | 4.2 | 2.8 |
| 32 | 181 | 26.5 | 4.6 | 2.7 |
| 36 | 157 | 22.8 | 8.7 | 5.1 |
| 40 | 146 | 10.5 | 4.6 | 2.9 |
| 44 | 109 | 0 | 0 | 0 |
| 48 | 118 | 0 | 0 | 0 |
| 52 | 106 | 0 | 0 | 0 |
| 56 | 125 | 0 | 0 | 0 |

Feed Rate = 13 GPM
Volume = 51786 gallons
pH = 6.97-7.01
Initial Se = 189-203 µg/l

| Run Time | Amount of Removal µg/l Carbon | Resin 1 | Resin 2 |
|---|---|---|---|
| 0 | 80.5 | 36.5 | 0 |
| 4 | 82 | 25 | 0 |
| 8 | 101.5 | 18.5 | 0 |
| 12 | 102.5 | 18.5 | 0 |
| 16 | 106.9 | 25.1 | −3.4 |
| 20 | 143.2 | 30.3 | 3.1 |
| 24 | 121.7 | 17.6 | 2.3 |
| 28 | 137.1 | 19.7 | 1.4 |
| 32 | 154.5 | 21.9 | 1.9 |
| 36 | 134.2 | 14.1 | 3.6 |
| 40 | 135.5 | 5.9 | 1.7 |
| 44 | 109 | 0 | 0 |
| 48 | 118 | 0 | 0 |
| 52 | 106 | 0 | 0 |
| 56 | 125 | 0 | 0 |

Although the present invention has been described in detail with reference to some preferred versions and examples, there are numerous variations on the present invention which are possible in light of the teachings and supporting examples described herein. It is therefore understood that within the scope of the following claims, the invention may be practiced otherwise than as specifically described or exemplified herein.

What is claimed is:

1. A method for removing selenium from an aqueous stream containing selenium comprising passing the aqueous stream in combination with a quaternary amine compound through a filter to produce an effluent which is depleted in selenium content relative to the untreated selenium-containing aqueous stream.

2. The method of claim 1, wherein the aqueous stream containing selenium is an oil refinery process wastewater.

3. The method of claim 1, wherein the aqueous stream containing selenium is an oil refinery process wastewater containing free and soluble oil.

4. The method of claim 1, wherein the filter comprises a filter media will absorb or otherwise remove a quaternary amine compound from an aqueous solution.

5. The method of claim 4, wherein the filter media is selected from the group consisting of clay, cellulose, starch, activated carbon and their mixtures.

6. The method of claim 1, wherein the aqueous stream is an oil refinery stripped sour water and the primary form of the selenium is selenocyanate.

7. The method of claim 1, wherein the quaternary amine compound has the general formula $R^1R^2R^3R^4N^+X^-$, where $R^1R^2R^3R^4$ are the same or different and are alkyl or aryl groups, and where X is an anion.

8. The method of claim 7, wherein the quaternary amine compound has the general formula $R^1R^2R^3R^4N^+X^-$, where $R^1R^2R^3R^4$ are the same or different and are selected from the group consisting of linear or branched paraffins having a chain length of $C_3$-$C_{30}$, and where X is a halogen.

9. A method for removing selenium from an aqueous stream containing selenium, the method comprising passing the aqueous stream, in combination with a quaternary amine, through a filter, the filter itself comprising a quaternary amine, to produce an effluent which is depleted in selenium content relative to the untreated selenium-containing aqueous stream.

10. The method of claim 9, wherein the aqueous stream containing selenium is an oil refinery process wastewater.

11. The method of claim 9, wherein the filter medium is present as a solid sorbent.

12. The method of claim 9, wherein the filter media is selected from the group consisting of clay, cellulose, starch, activated carbon and their mixtures.

13. The method of claim 9, wherein the aqueous stream is an oil refinery stripped sour water and the primary form of the selenium is selenocyanate.

14. The method of claim 9, further comprising a prefiltering step.

15. The method of claim 9, wherein the effluent is passed through a filter medium comprising activated carbon to produce a second effluent which is depleted in selenium content relative to the first effluent.

16. The method of claim 15, wherein the second effluent is contacted by an anion exchange resin to produce a third effluent which is depleted in selenium content relative to the second effluent.

17. A method for removing selenium from an aqueous stream containing selenium, the method comprising passing the aqueous stream, in combination with a quaternary amine, through a filter, the filter itself comprising a quaternary amine, to produce a first effluent which is depleted in selenium content relative to the untreated selenium-containing aqueous stream; passing the first effluent through a filter medium comprising activated carbon to produce a second effluent which is depleted in selenium content relative to the first effluent; and contacting the second effluent by an anion exchange resin to produce a third effluent, which is depleted in selenium content relative to the second effluent.

18. A method for removing selenocyanate from an aqueous stream containing selenocyanate, as well as free and soluble oil, the method comprising passing the aqueous stream, in combination with a quaternary amine compound, through a filter to produce an effluent which is depleted in selenocyanate content relative to the untreated selenocyanate-containing aqueous stream.

19. The method of claim 18, wherein the filter comprises a filter media will absorb or otherwise remove a quaternary amine compound from an aqueous solution.

20. The method of claim 19, wherein the filter media is selected from the group consisting of clay, cellulose, starch, activated carbon and their mixtures.

* * * * *